Jan. 22, 1924.

F. MERZ 1,481,723

APPARATUS FOR EVAPORATING LIQUIDS

Filed May 19, 1920    2 Sheets-Sheet 1

Inventor:
Franco Merz
By his Attorney

Jan. 22, 1924.  
F. MERZ  
1,481,723  
APPARATUS FOR EVAPORATING LIQUIDS  
Filed May 19, 1920  2 Sheets-Sheet 2
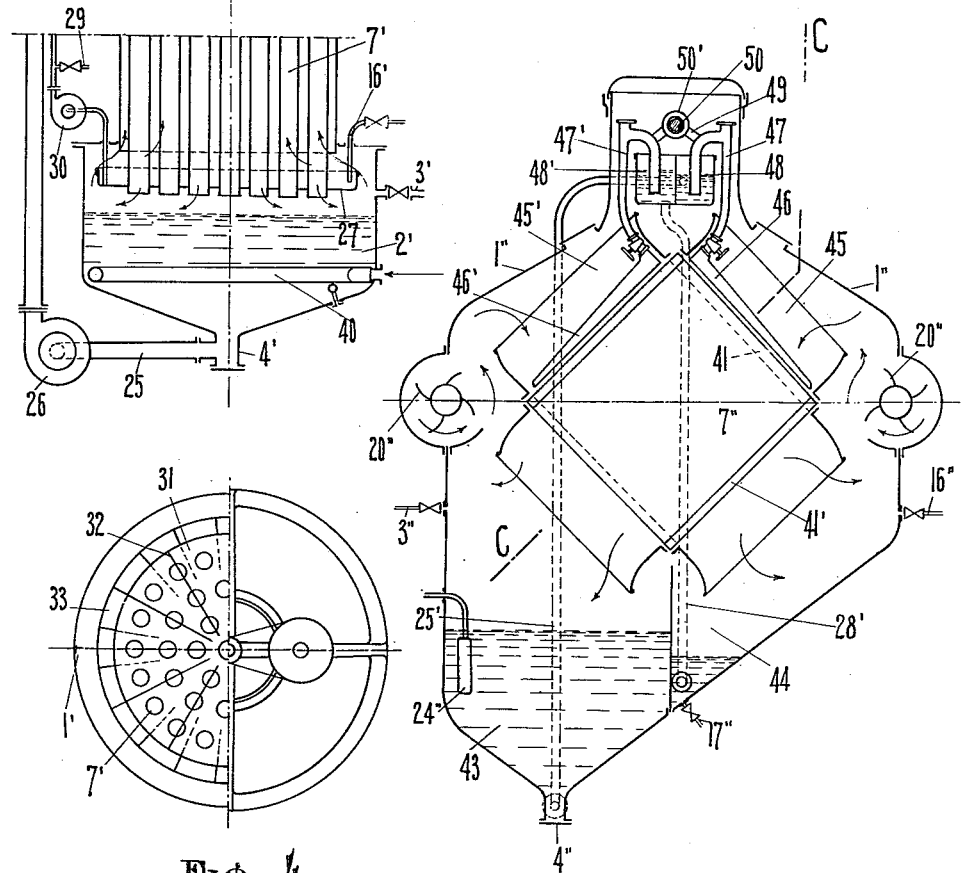
Inventor:  
Franco Merz  
By [signature]  
Attorney.

Patented Jan. 22, 1924.

1,481,723

UNITED STATES PATENT OFFICE.

FRANCO MERZ, OF VERCELLI, ITALY.

APPARATUS FOR EVAPORATING LIQUIDS.

Application filed May 19, 1920. Serial No. 382,538.

*To all whom it may concern:*

Be it known that I, FRANCO MERZ, a citizen of the Republic of Switzerland, residing at Vercelli, Italy, have invented certain new and useful Improvements in Apparatus for Evaporating Liquids, of which the following is a specification.

This invention relates to apparatus for evaporating liquids; and it has for its object an apparatus by means of which the evaporation of liquids (for the purpose of concentrating or drying them) is obtained by causing a current of air or other gas to circulate and to contact in succession with the liquid to be treated and with a liquid adapted to absorb the vapour of the first liquid, the two liquids being spread over the opposite surfaces of thin walls preferably made of a material which is a good conductor of heat.

Thus the heat given off by the absorbing liquid during the operation, which heat would reduce its absorbing power, is directly imparted to the liquid under treatment for the purpose of producing the evaporation of this latter. The difference between the temperatures of the two liquids is thereby reduced to a minimum and the output of the apparatus is held unchanged.

In the apparatus according to this invention the temperature may be held at any desired value by means of a heating or cooling medium, the required supply of heat being reduced to the amount required for carrying the liquids at the desired temperature and for compensating for losses by radiation.

The apparatus may be used for removing water from liquids of any kind—also, when mixed with solid materials—by using, as the absorbing medium, a hygroscopic liquid such as sulphuric acid, or a concentrated solution of calcium chloride. It may also be used for removing liquids of any kind by using a liquid adapted to absorb the vapours of the liquid to be treated.

Figure 1:
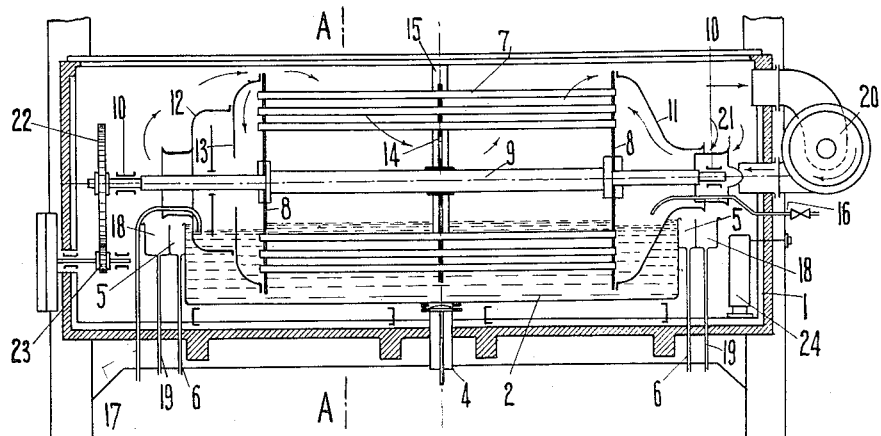
Figure 2:
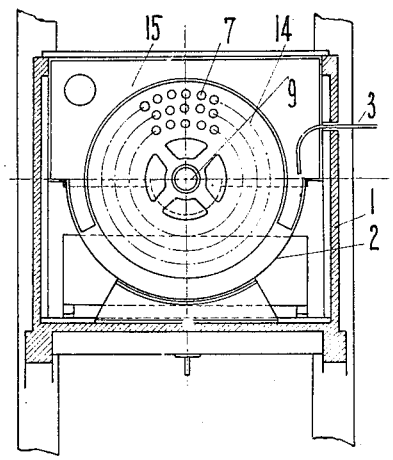
Figure 6:
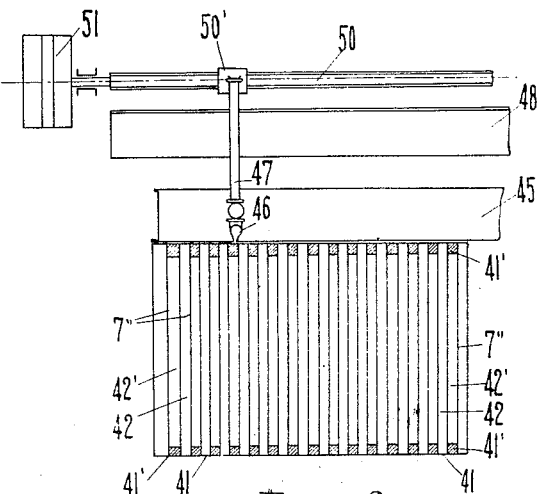

The annexed drawings show by way of example some embodiments of an apparatus according to this invention:

Figure 1 is a longitudinal section of one construction; Fig. 2 is a transverse section of the same on line A—A, Fig. 1; Fig. 3 is a vertical section of another construction; Fig. 4 is a plan view thereof, partly in section on line B—B, Fig. 3; Fig. 5 is a transverse section of a further construction and Fig. 6 is a transverse section on line C—C, Fig. 5.

In the construction shown in Figs. 1 and 2, the apparatus comprises a casing 1, on the bottom of which is located a tank 2 adapted to contain the liquid to be treated which is admitted through a pipe 3 (Fig. 2) and may be discharged through a pipe 4. The contents of tank 2 may overflow into pockets 5 having exhaust ducts 6.

A drum 7 is rotatably mounted within casing 1 with its axis horizontal and parallel with the longitudinal axis of the tank 2, and said drum comprises a nest of tubes 7 mounted in tube sheets 8 which close the space between the tubes and are rigidly connected to a shaft 9 journalled in bearings 10.

This drum projects partially into the tank 2 and is provided at its ends with heads 11 and 12 each having a central opening, one head 12 being preferably provided with baffles 13. The interior of the drum is divided into compartments by one or more transverse partitions, the single partition 14 shown in Figs. 1 and 2 having openings near its center; but where a plurality of such partitions are used, the successive partitions will have their openings located alternately near their centers and near their peripheries.

The casing 1 is provided, in turn, with one or more partitions 15 (Fig. 2), corresponding with the drum partitions 14, so that the gases must follow a sinuous path in travelling through the drum.

The tubes 7, in cooperation with the tube sheets and heads 11 and 12, provide a closed chamber, the absorbing liquid being fed therein through a pipe 16 and discharged therefrom through a pipe 17. The pockets 18 having exhaust pipes 19 are intended to collect the liquid over-flowing from the mouths of heads 11 and 12.

A fan 20 is connected at one side with the casing 1 and at the other side with the head 11, if required through a number of sleeves 21.

The shaft 9 is driven by a suitable gearing, say by means of pinions 22 and 23, the latter being driven from any desired source of power.

After the tank 2 has been filled with the liquid to be treated and the lower portion of the rotatable drum has been filled with the absorbing liquid, the shaft 9 is operated and thus the several radial rows of tubes 7 are sunk in succession in tank 2 and are exposed in casing 1, while the absorbing liquid enters the tubes 7 when they are submerged in said tank and flows from the same when they rise up above the liquid level.

At each revolution of the shaft 9 and of the drum 7—8—11—12, said tubes have their outer and inner surfaces wetted with the liquid to be treated and with the absorbing liquid, respectively; and in the remaining portion of their revolution said surfaces are exposed to a stream of air or other gas caused by fan 20 to circulate through casing 1 and inside head 11, tubes 7 and head 12, as shown by arrows in Fig. 1.

The gas propelled by the fan 20 and entering the head 11 is caused to pass through the tubes 7 which are not filled with liquid, the tube sheet 8 closing any other passage; and the gas exhausted by said fan is caused to leach the outer surface of said tubes, due to the deflecting action of the baffles 13, 14 and 15.

During the above described operation, the gas is successively charged with vapours of the liquid wetting the outer surface of the tubes 7, and gives off said vapour to the absorbing liquid wetting the inner surface of the tubes.

The tubes 7 may obviously have any required size and sectional shape, and they are preferably made of material which is a good conductor of heat, so that the difference between the temperatures in the spaces inside and outside of the tubes is reduced to a minimum, and the liquids wetting the inner and outer surfaces of the same tubes have a substantially even temperature.

Said tubes may also be made of glass, the tube sheets being in this case of rubber or the like.

Should the temperature be modified, it is sufficient to supply heat in casing 1, this being obtained, say, by an electric radiator 24, or to remove heat from said casing by any appropriate means.

In the construction shown in Figs. 3 and 4, the surfaces to be wetted by the two liquids are provided by a nest of vertical tubes 7' mounted into a casing 1' and opening at both ends in the same; this casing 1' providing a bottom tank 2' for the liquid to be treated.

This liquid is supplied to said tank by a valved connection 3', and may be discharged through an exhaust 4', a duct 25 including a pump 26 being utilized to force the liquid to the top of the apparatus.

The absorbing liquid is fed through a duct 16' into a tank 27 encircling the lower end of tubes 7', a duct 28 having a valved exhaust 29 and a pump 30 being employed to raise said absorbing liquid to the top of the apparatus.

At the upper end of the tube nest 7' is mounted a tank 31, through the bottom of which the tubes 7' open, this tank having a number of radial partitions 32 providing in said tank a number of chambers, into each of which opens a number of said tubes. Another tank 33 provided with radial partitions and located below tank 31 encircles the upper ends of the tubes; a narrow annular space being left between the edges of the perforations in the bottom of said tank 33 and the surfaces of the tubes, so that the liquid passing through said spaces is caused to flow down along said tubes in a thin layer.

In the tank 31 and above partitions 32 is provided a peripheral channel 31' which is open at its bottom and into which opens a duct 34 connected with a pocket 36 mounted to rotate around the central vertical axis of casing 1' and driven by a toothed ring 38 operated by a pinion 39 which may be rotated in any suitable way, say by means of a belt and pulleys, from the shaft of the fan 20' hereinafter referred to.

Another pocket 37 is disposed concentric with and is rigidly connected to pocket 36, and is provided with a duct 35 opening into the tank 33 above the radial partitions 33'; said pockets 36 and 37 and ducts 34 and 35 rotating together when the apparatus is in operation.

Into said pockets 36 and 37 open tubes 25 and 28, respectively; the liquid fed by tube 25 being thus supplied through pocket 36 and duct 34 to tank 31, and the liquid fed by the pipe 28 being supplied by pocket 37 and duct 35 to tank 33.

In operation, the fan 20' draws air or another gas from casing 1' and the space intermediate the tubes 7', and forces it into said tubes 7'; at the same time, the rotary ducts 34 and 35 supply the liquid to be treated and the absorbing liquid into tanks 31 and 33, respectively, so that said liquids are caused to flow down along the tubes and to wet in succession the surfaces of the rows of tubes opening in the radial chambers of said tanks, in which open at the time the said ducts 34 and 35. Thus the gas is charged with vapours of the liquid to be treated when leaching the inner surface of the tubes, and gives off these vapours to the absorbing liquid which is spread over the outer surface of the same tubes. But the arrangement may obviously be reversed so as to cause the absorbing liquid to flow down along the inner surface of the tubes and the liquid to be treated to flow along the outer surface of the same.

The temperature of the liquid to be treated may be modified at will by circulating a heating or cooling medium through a tube 40.

The bottom of tank 31 is preferably provided with mouths or sleeves projecting into tubes 7', as shown in Fig. 3, to cause the falling liquid to form a layer on the tube surface.

In the construction shown in Figs. 5 and 6, the surfaces to be wetted by the two liquids are provided by plates 7'' arranged parallel with one another. Each plate is connected with the adjacent plates by two pairs of rods 41 and 41' disposed along two opposite edges of said plates; but the said rods 41 and 41', which are placed in the successive spaces between the different plates 7'' occupy different edges of said plates (Fig. 5). The plates 7'' and the rods 41 thus form one row of parallel channels 42, and the plates 7'' and the rods 41' form a second row of parallel channels 42'; the channels 42 and 42' alternating and extending in two directions perpendicular to each other.

Said channels 42 and 42' open in directions perpendicular to each other and are inclined with regard to the vertical.

The row of plates 7'' is enclosed within a casing 1'' provided at its bottom with two tanks 43 and 44 for the liquids, said tanks having inlet and exhaust means 3'' and 16'' and 4'' and 17'', respectively. The series of channels 42 open into the tank 43, and the channels 42' open into tank 44. The nest of plates 7'' forms, as a whole, a prism having its axis disposed horizontally, and sides of which are inclined. Each of the sides is surrounded by a rim 45—45' and each of these rims forms a mouth which encloses the openings of one row of channels 42 or 42' to prevent one liquid, before it is distributed through the row of channels 42, from mixing with the other liquid to be distributed through the channels 42', and vice versa.

The arrangement for wetting the plates 7'' is hereinafter described. Above the row of plates 7'' are mounted two tanks 48—48', to which the absorbing liquid and the liquid to be treated are supplied from their respective bottom tanks 44 and 43 by means of pipes 28' and 25' and of pumps (not shown). From the tank 48 leads a siphon tube 47 supplying the liquid to a distributor 46, and a similar siphon tube 47' leads from tank 48' to a distributor 46'; said siphon tubes being connected together by means of rods 49 and of a screw-threaded collar 50' operated by a threaded spindle 50 driven by a set of forward, loose and reverse pulleys 51.

The distributors 46 and 46' are thus caused to reciprocate along the edge of plates 7'', so as to cause the liquid fed to them to fall in succession along opposite surfaces of several plates 7''; while the air or other gas enclosed within casing 1 is caused to circulate in the channels 42—42' intermediate said plates by the fan 20''.

Thus the described operation is obtained.

A heating or cooling device 24'' is provided in tank 43 for the purpose of modifying the temperature of the liquid to be treated.

The described apparatus gives a large output because the exchange of heat between the absorbing liquid and the liquid to be treated takes place in a quick manner, thus preventing a difference of temperature from arising between said liquid, which difference would reduce the absorbing power of the absorbing liquid and the evaporative power of the liquid to be treated.

I claim as my invention:—

1. An apparatus for evaporating liquids, comprising a casing, a plurality of hollow members in said casing, means for wetting one surface of said members with the liquid to be treated, means for wetting the other surface of said members with an absorbing liquid, and means for causing a gas to circulate through said casing in contact with said surfaces.

2. An apparatus for evaporating liquids, comprising a casing, a plurality of rows of hollow members in said casing, means for wetting in succession one surface of the rows of the members with the liquid to be treated, means for wetting in succession the other surface of the rows of members with an absorbing liquid, and means for causing a gas to circulate through said casing in contact with said surfaces.

3. An apparatus for evaporating liquids, comprising a casing, a plurality of rows of hollow members in said casing, means for wetting in succession one surface of the rows of members with the liquid to be treated, means for wetting in succession the other surface of the rows of members with an absorbing liquid, and means for causing a gas to circulate through said casing in contact with said surfaces.

4. An apparatus for evaporating liquids, comprising a casing, hollow members providing channels in said casing, means for wetting one surface of said members with the liquid to be treated, means for wetting the other surface of said members with an absorbing liquid, and means for causing a gas to circulate through said casing and channels in contact with said surfaces.

5. An apparatus for evaporating liquids, comprising a casing, a plurality of hollow members in said casing, means for wetting one surface of said members with the liquid to be treated, means for wetting the other surface of said members with an absorbing liquid, means for causing a gas to circulate through said casing in contact with said surfaces, and means for modifying the temperature of the liquid under treatment.

6. An apparatus for evaporating liquids comprising a casing, a plurality of hollow members in said casing, means for spreading a layer of the liquid to be treated on one surface of said members, means for spreading a layer of an absorbing liquid on the other surface of said members, and means for causing a gas to circulate through said casing in contact with said surfaces.

7. An apparatus for evaporating liquids comprising a casing, a plurality of rows of hollow members in said casing, means for spreading a layer of the liquid to be treated on one surface of the rows of members in succession, means for spreading a layer of an absorbing liquid on the other surface of said rows of members in succession, and means for causing a gas to circulate through said casing in contact with said surfaces.

In testimony whereof I affix my signature.

FRANCO MERZ.